United States Patent
Bedkowski et al.

(10) Patent No.: US 8,595,900 B2
(45) Date of Patent: Dec. 3, 2013

(54) ELECTRICAL SYSTEM ENCLOSURE

(75) Inventors: Jozef Zbigniew Bedkowski, Slaskie (PL); Johan Rene Sylvain De Cuyper, Oost Vlaanderen (BE)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 13/435,298

(22) Filed: Mar. 30, 2012

(65) Prior Publication Data

US 2013/0257248 A1  Oct. 3, 2013

(51) Int. Cl.
*E05D 15/50* (2006.01)

(52) U.S. Cl.
USPC ............. 16/232; 16/386; 312/324; 312/223.1

(58) Field of Classification Search
USPC ........... 16/229, 230, 231, 232, 235, 236, 237, 16/262, 386; 312/324, 223.1
See application file for complete search history.

(56) References Cited

U.S. PATENT DOCUMENTS

| | | | |
|---|---|---|---|
| 3,618,804 A | 11/1971 | Krause | |
| 3,697,714 A | 10/1972 | Gryctoko et al. | |
| 4,190,929 A * | 3/1980 | Palka | 16/381 |
| 5,355,556 A | 10/1994 | Lyon | |
| 5,530,992 A * | 7/1996 | Baermann | 16/231 |
| 5,722,121 A * | 3/1998 | Lau et al. | 16/381 |
| 5,926,916 A * | 7/1999 | Lee et al. | 16/230 |
| 6,089,168 A | 7/2000 | Dunlap et al. | |
| 6,399,882 B1 | 6/2002 | Faulkner et al. | |
| 6,684,457 B2 | 2/2004 | Holt | |
| 6,721,994 B2 * | 4/2004 | Bowman et al. | 16/262 |
| 7,159,767 B2 | 1/2007 | McCracken et al. | |
| 7,420,133 B2 | 9/2008 | Farrow et al. | |
| 8,464,396 B2 * | 6/2013 | Westby et al. | 16/380 |
| 2002/0095744 A1 * | 7/2002 | Narang et al. | 16/229 |
| 2004/0000028 A1 * | 1/2004 | Kim | 16/230 |

* cited by examiner

*Primary Examiner* — Jeffrey O Brien

(74) *Attorney, Agent, or Firm* — Cantor Colburn LLP

(57) ABSTRACT

A door hinge includes a hinge body, a hinge pin, and a hinge base. The hinge body includes a first channel that defines a first axis, the hinge body further includes a slot formed therethrough at an angle to the first axis, and the hinge body further includes a retention apparatus arranged within the slot. The hinge pin is operatively disposed in the first channel and configured to travel along the first axis, the hinge pin includes at least three retention formations formed thereon, a first retention formation defines a first retention position, a second retention formation defines a second retention position, a third retention formation defines a third retention position, and the retention apparatus is configured to engage the hinge pin at one of the at least three retention formations. The hinge base includes a second channel configured to operatively receive at least a portion of the hinge pin.

20 Claims, 7 Drawing Sheets

ELECTRICAL SYSTEM ENCLOSURE

BACKGROUND OF THE INVENTION

The subject matter disclosed herein relates to an enclosure, more particularly to electrical system enclosures, and even more particularly, exemplary embodiments of the present invention relate to apparatuses allowing simplified access within electrical system enclosures.

Electrical system enclosures are designed to permit access by persons operating or servicing the electrical system enclosures or components housed therein. In order to access and service the components, a variety of access panels and doors may be used. In some enclosures, a minimum of tool-required-entry or tool-required-access must be implemented to avoid unauthorized opening of electrical system enclosures. Furthermore, an appropriate seal level or ingress protection may be required in which electrical componentry is protected from outside elements. For example, a turn-key or screw-locking system may be employed which requires a specific key or tool to deactivate a locking means attached to an electrical system access panel and/or door. This turn-key or screw-locking system may also position the access panel or door such that an appropriate level of ingress protection is afforded, for example, by positioning the access panel or door within a framing of the electrical system enclosure.

It follows then, that for access panels and doors set within framing of an electrical system enclosure, complex hinges must be used to allow a sufficient amount of opening of the panel or door such that appropriate service may be performed within the electrical system enclosure (e.g., more than 90 degrees of opening). Furthermore, these complex hinges drive increased costs, increase the possibility of failure, and require additional skill to operate properly.

BRIEF DESCRIPTION OF THE INVENTION

According to an exemplary embodiment of the present invention, a door hinge includes a hinge body, wherein the hinge body includes a first channel, wherein the first channel defines a first axis, wherein the hinge body further includes a slot formed therethrough at a first angle to the first axis, and wherein the hinge body further includes a retention apparatus arranged within the slot. The door hinge further includes a hinge pin operatively disposed in the first channel and configured to travel along the first axis, wherein the hinge pin includes at least three retention formations formed thereon, wherein a first retention formation of the at least three retention formations defines a first retention position, wherein a second retention formation of the at least three retention formations defines a second retention position, wherein a third retention formation of the at least three retention formations defines a third retention position, and wherein the retention apparatus is configured to engage the hinge pin at one of the at least three retention formations. Furthermore, the door hinge further includes a hinge base, wherein the hinge base includes a second channel configured to operatively receive at least a portion of the hinge pin.

According to another exemplary embodiment of the present invention, an enclosure includes an upper panel, an enclosure base opposite the upper panel, and a door frame arranged between the upper panel and the enclosure base having at least four door hinges. Each door hinge of the at least four door hinges includes a hinge body, wherein the hinge body includes a first channel, wherein the first channel defines a first axis, wherein the hinge body further includes a slot formed therethrough at a first angle to the first axis, and wherein the hinge body further includes a retention apparatus arranged within the slot. Each door hinge further includes a hinge pin operatively disposed in the first channel and configured to travel along the first axis, wherein the hinge pin includes at least three retention formations formed thereon, wherein a first retention formation of the at least three retention formations defines a first retention position, wherein a second retention formation of the at least three retention formations defines a second retention position, wherein a third retention formation of the at least three retention formations defines a third retention position, and wherein the retention apparatus is configured to engage the hinge pin at one of the at least three retention formations. Furthermore, each door hinge further includes a hinge base, wherein the hinge base includes a second channel configured to operatively receive at least a portion of the hinge pin.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described above, conventional electrical system enclosures require complex hinges to allow a sufficient amount of opening of an access panel or door such that appropriate service may be performed within the electrical system enclosures. These complex hinges drive increased costs, increase the possibility of failure, and require additional skill to operate properly. However, according to exemplary embodiments of the present invention, an apparatus has been provided which significantly simplifies access to electrical system enclosures while maintaining suitability for its intended purpose.

Figure 1:
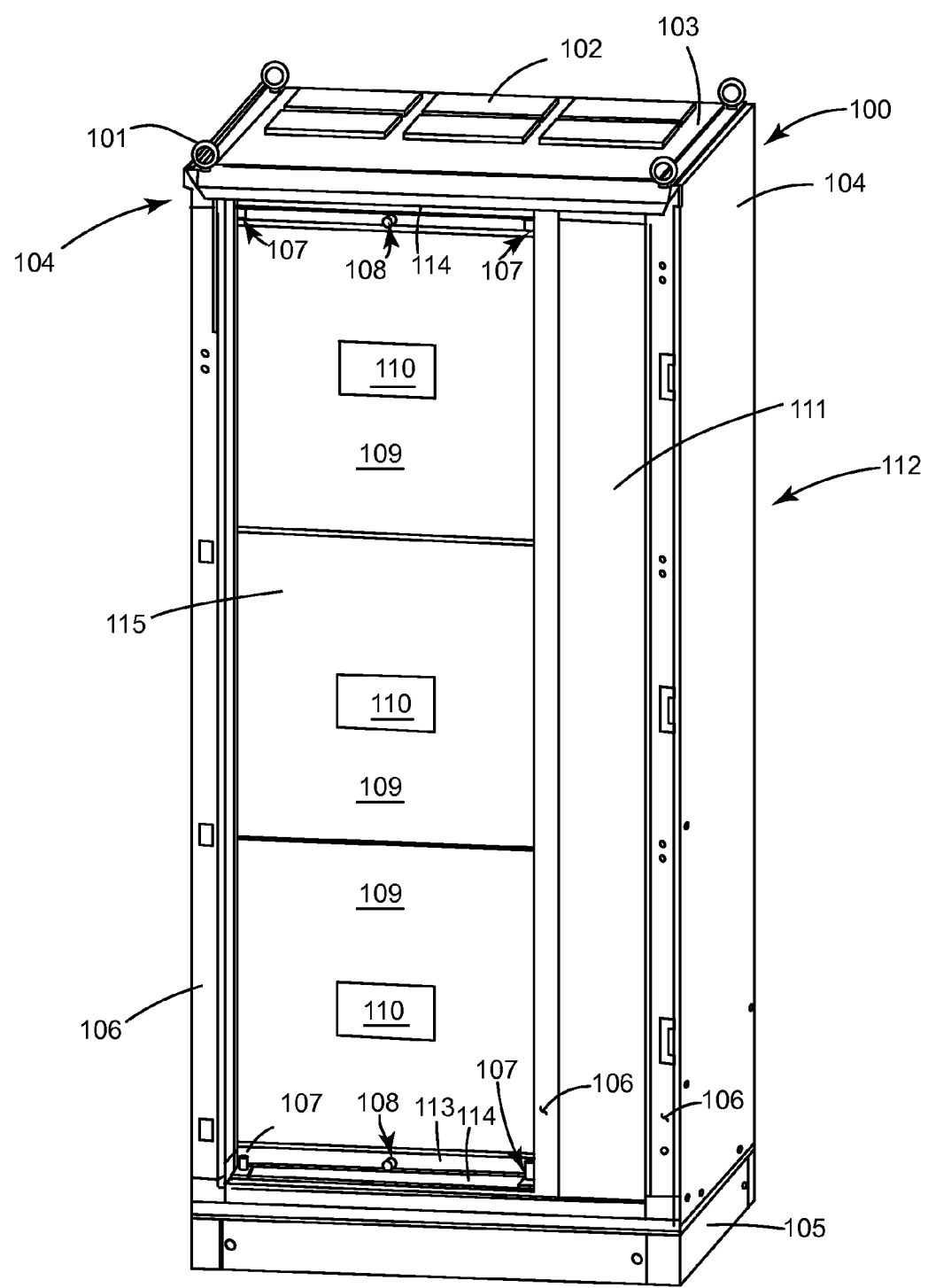
FIG. 1 illustrates an electrical system enclosure, according to an exemplary embodiment.

Turning now to the drawings, FIG. 1 illustrates an electrical system enclosure 100, according to an exemplary embodiment. As illustrated, the enclosure 100 includes base 105 configured to support front panel 111, side panels 104 arranged proximate the front panel 111, and rear panel 112 arranged proximate to both side panels 104. The enclosure 100 further includes upper panel 103 arranged proximate the front panel 111, side panels 104, and rear panel 112. Therefore, all of panels 111, 104, 112, and 103 and base 105 form an enclosure defining an interior space capable of supporting and protecting electrical components. However, it should be appreciated that the enclosure 100 may also omit one or more of the above noted panels depending upon any desired implementation. Therefore, an open panel, partially open panel, or any other permutation is equally applicable to exemplary embodiments of the present invention.

Upper panel 103 may include a plurality of support structures 101 arranged thereon. For example, support structures 101 may be embodied as eye bolts or other similar structures, configured to receive a securing cable to secure the enclosure 100 against tipping or falling over. Upper panel 103 may further include a plurality of access covers 102. The access covers 102 may cover and protect openings on the upper panel 103 (not illustrated for clarity). The plurality of openings covered with the access covers 102 may provide for interconnection of electrical components within the enclosure 100 to systems external to the enclosure 100, for example, through the use of specialized connectors (e.g., HARTING HAN® connectors, BRAD HARRISON® connectors, rectangular plugs, circular pin interconnects, bus bar connections, or other suitable connectors).

As further illustrated, the front panel 111 may include a plurality of vertical support pillars 106 arranged substantially orthogonal to the base 105. The support pillars 106 may be configured to attach the front panel 111 to side panels 104 and/or to support door frame 113. As noted above, the enclosure 100 may omit the front panel 111 and side panels 104, therefore, door frame 113 may be otherwise supported in alternative implementations.

Door frame 113 may be a substantially rectangular frame configured to support a plurality of door panels 109 so as to form a functional door assembly 115 for gaining access to the interior space of the enclosure 100. Each door panel 109 may include a cutout 110 arranged thereon to allow access of electrical components within the enclosure 100 protruding through the cutout 110. Furthermore, the door frame 113 may include fastener holes 108 configured to allow securing of the functional door assembly 115 against the enclosure 100 with a plurality of fasteners. In this manner, a suitable seal may be formed which conforms to a plurality of desired standards.

Figure 2:
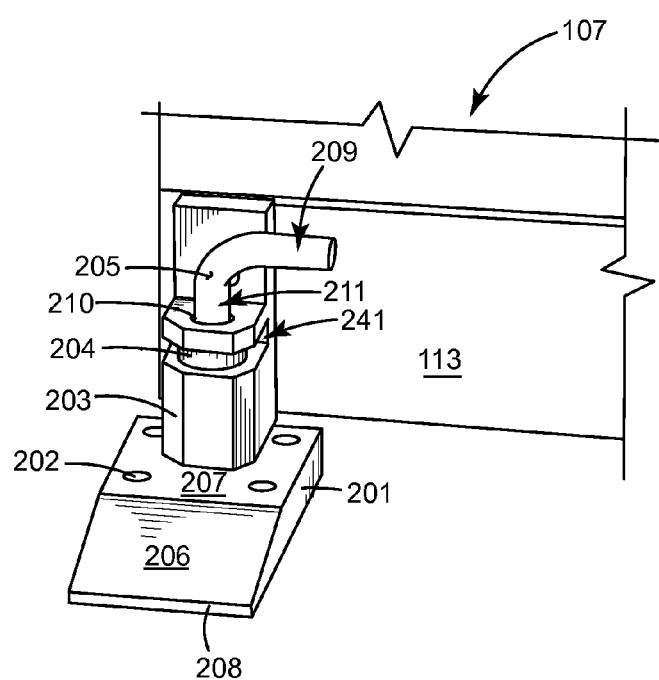
FIG. 2 illustrates a door hinge for an electrical system enclosure, according to an exemplary embodiment.

As further illustrated, the door frame 113, and thus the functional door assembly 115, may be supported by at least four door hinges 107. The door hinges 107 are configured to engage the base 105 and upper panel 103 through locking members 114 arranged proximate thereto. For example, a first locking member 114 may be arranged proximate the upper panel 103 and a second locking member 114 may be arranged proximate the base 105. Such is illustrated more clearly in FIGS. 3-6. Turning now to FIG. 2, a more detailed description of an exemplary door hinge 107 is provided.

FIG. 2 illustrates a door hinge 107 for the electrical system enclosure 100 of FIG. 1, according to an exemplary embodiment. Each door hinge 107 includes three main portions, hinge base 201, hinge body 203, and hinge pin 205.

The hinge base 201 is a generally trapezoidal solid comprising a minor face 208, and inclined major face 206 proximate the minor face 208, and a level major face 207 arranged proximate the inclined major face 206. According to some exemplary embodiments, the minor face 208 may be omitted. Furthermore, the level major face 207 may include a plurality of screw holes 202 configured to allow attachment of the hinge base 201 to locking members 114 illustrated in FIG. 1.

The hinge body 203 is configured to receive and support the hinge pin 205 through a first channel 210 formed therethrough such that the hinge pin 205 may selectively engage the hinge base 201. The hinge body 203 may include slot 241 formed therethrough on a plane at a first angle substantially orthogonal to the axis Y' and configured to support retention apparatus 204. Non-orthogonal angular relationships between the slot 241 and axis Y' may also be supported. The retention apparatus 204 is configured to deform and engage the hinge pin 205 to allow selective engagement of the hinge pin 205 and hinge base 201. The retention apparatus 204 may be a deformable retainer clip, deformable ring or gasket, or any suitable apparatus capable of engaging the hinge pin 205. In this manner, the hinge pin 205 may be positioned to either engage with the hinge base 201 or not engage with the hinge base 201. Such is illustrated more clearly in FIG. 3.

Figure 3:
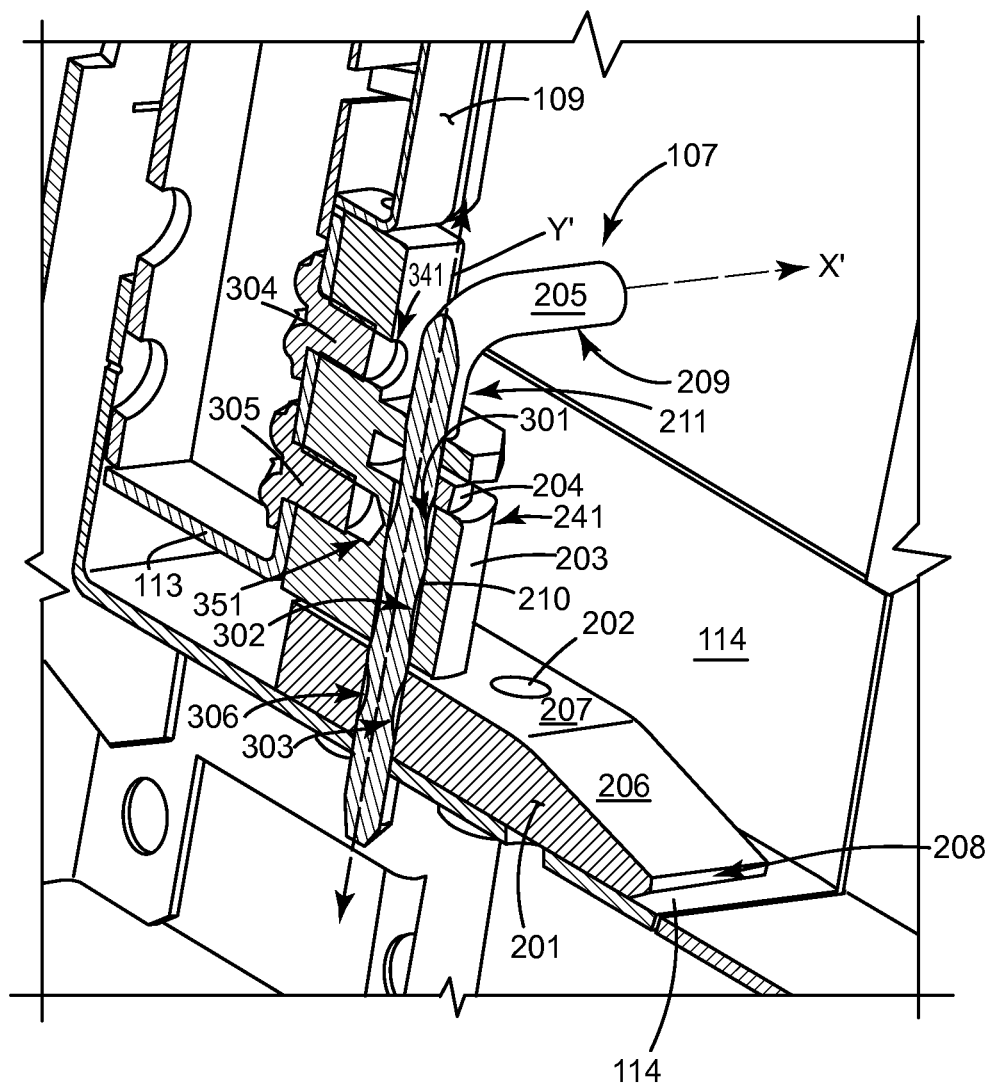
FIG. 3 is a cross-sectional perspective view of the door hinge of FIG. 2.

FIG. 3 is a cross-sectional perspective view of the door hinge 107 of FIG. 2. As illustrated, the hinge pin 205 includes a plurality of retention formations including a first retention formation 301, a second retention formation 302, and a third retention formation 303 configured to engage the retention apparatus 204. The first retention formation 301 defines a first retention position. The second retention formation 302 defines a second retention position. The third retention formation 303 defines a third retention position. The retention formations 301, 302, and 303 may be equally spaced along a primary axis of hinge pin travel labeled axis Y'. Further, the hinge pin 205 is configured to slide within the hinge body 203 along axis Y'. The retention apparatus 204 is formed of a deformable material, such as for example latex, rubber, spring metal, or any suitable elastomeric or deformable material. Thus, as the hinge pin 205 is slid along the axis Y', the retention apparatus 204 deforms and engages one of the retention formations 301, 302, or 303, for example by constricting against the surface of the hinge pin 205 and against one of the retention formations 301, 302, or 303, thereby supporting the hinge pin 205 in one of three hinge positions. Furthermore, the hinge pin 205 comprises a first portion 211 disposed along the Y' axis. Additionally, the hinge pin 205 includes a second portion 209 on the axis X', which is at a second angle substantially orthogonal to axis Y'. Non-orthogonal angular relationships between the axis X' and axis Y' may also be supported. A user can grasp the second portion 209 and move the hinge pin 205 into one of the three hinge positions.

Figure 4:
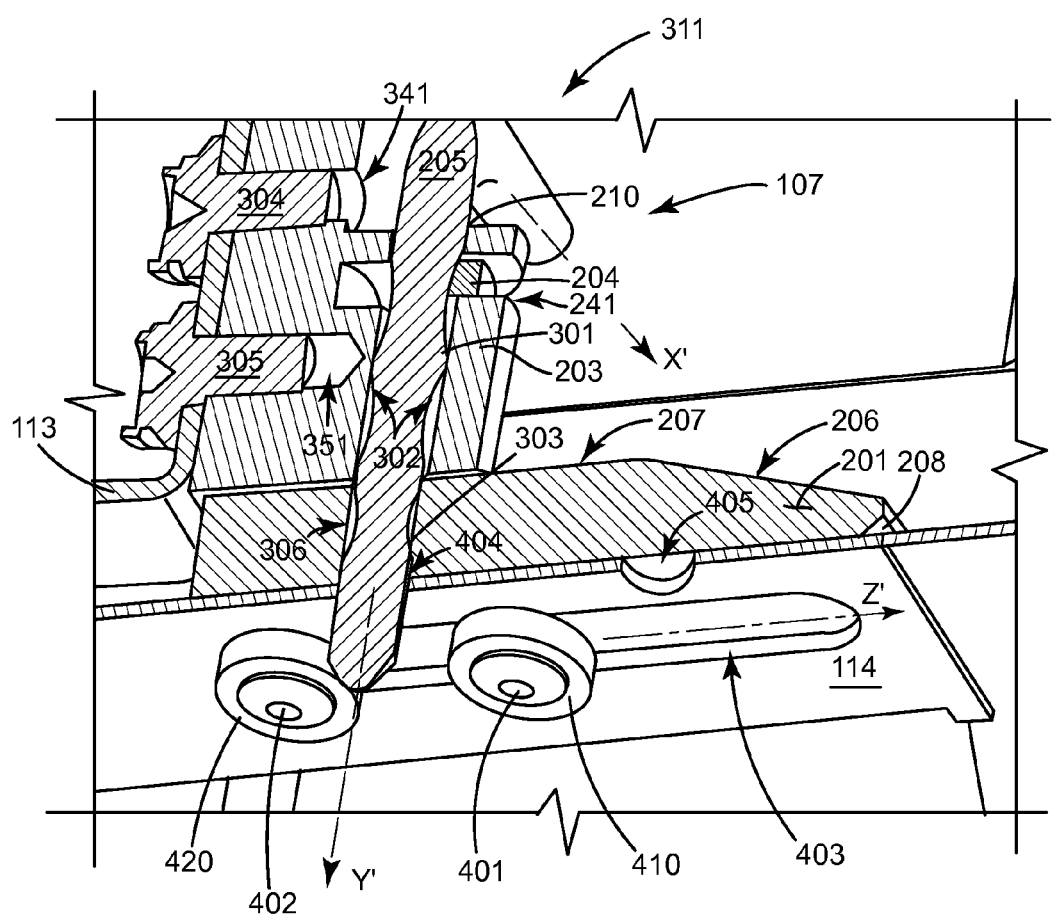
FIG. 4 is a cross-sectional perspective view of the door hinge of FIG. 2.

Turning to FIG. 4, a first hinge position 311 of the three hinge positions may be defined as a position where the hinge pin 205 protrudes through the hinge base 201 within a second channel 306 and engages the locking member 114, thereby locking the hinge 107. As such, the first hinge position 311 may be termed a fully locked hinge position. The hinge pin 205 illustrated in FIG. 4 is in the fully locked hinge position. In this fully locked hinge position, the retention apparatus 204 engages the first retention formation 301 as the first retention position.

Figure 5:
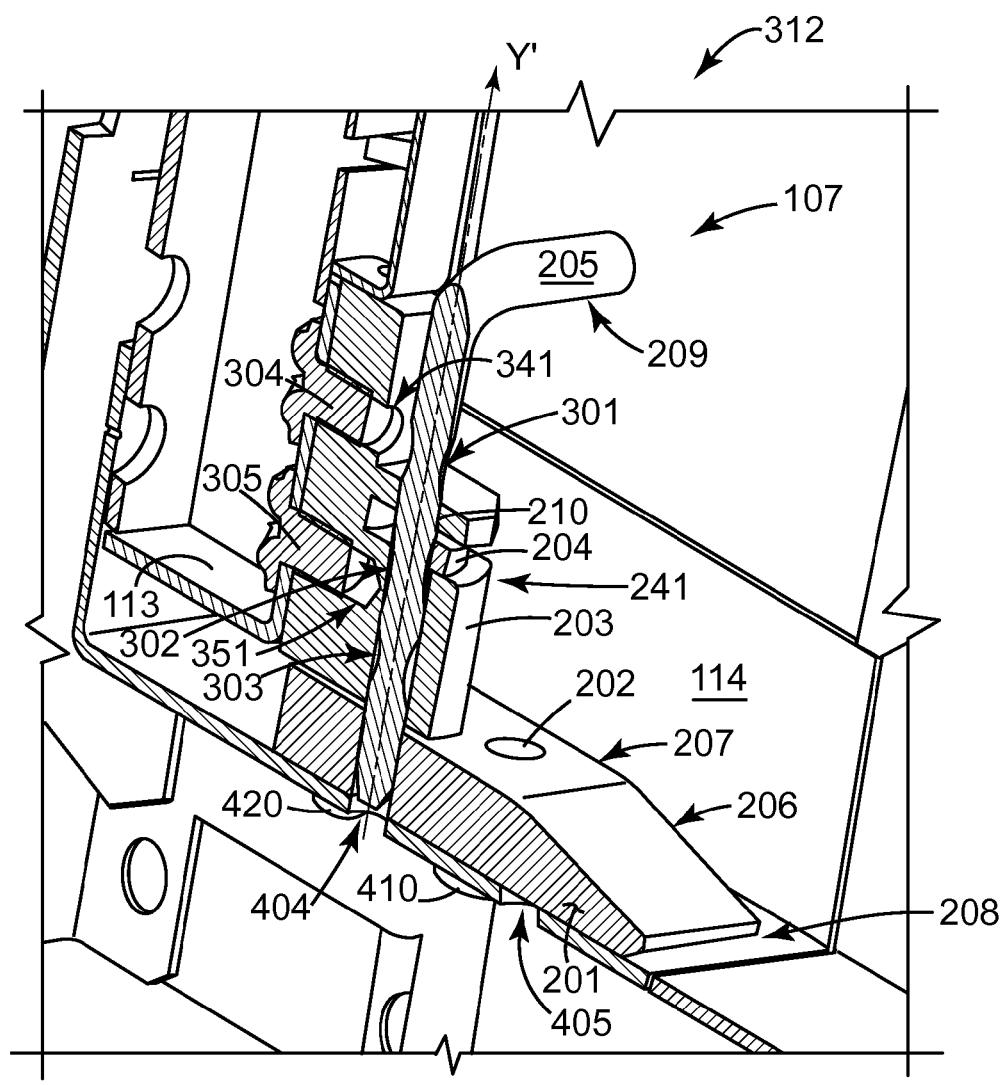
FIG. 5 is a cross-sectional perspective view of the door hinge of FIG. 2.

Turning to FIG. 5, a second hinge position 312 of the three hinge positions may be defined as a position where the hinge pin 205 does not entirely protrude through the hinge base 201, thereby not engaging the locking member 114 but still restricts movement of the hinge body 203 relative to the hinge base 201. As such, this second hinge position 312 may be termed a partially locked hinge position. The hinge pin 205 illustrated in FIG. 5 is in the partially locked hinge position. In this partially locked hinge position, the retention apparatus 204 engages the second retention formation 302 as the second retention position.

Figure 6:
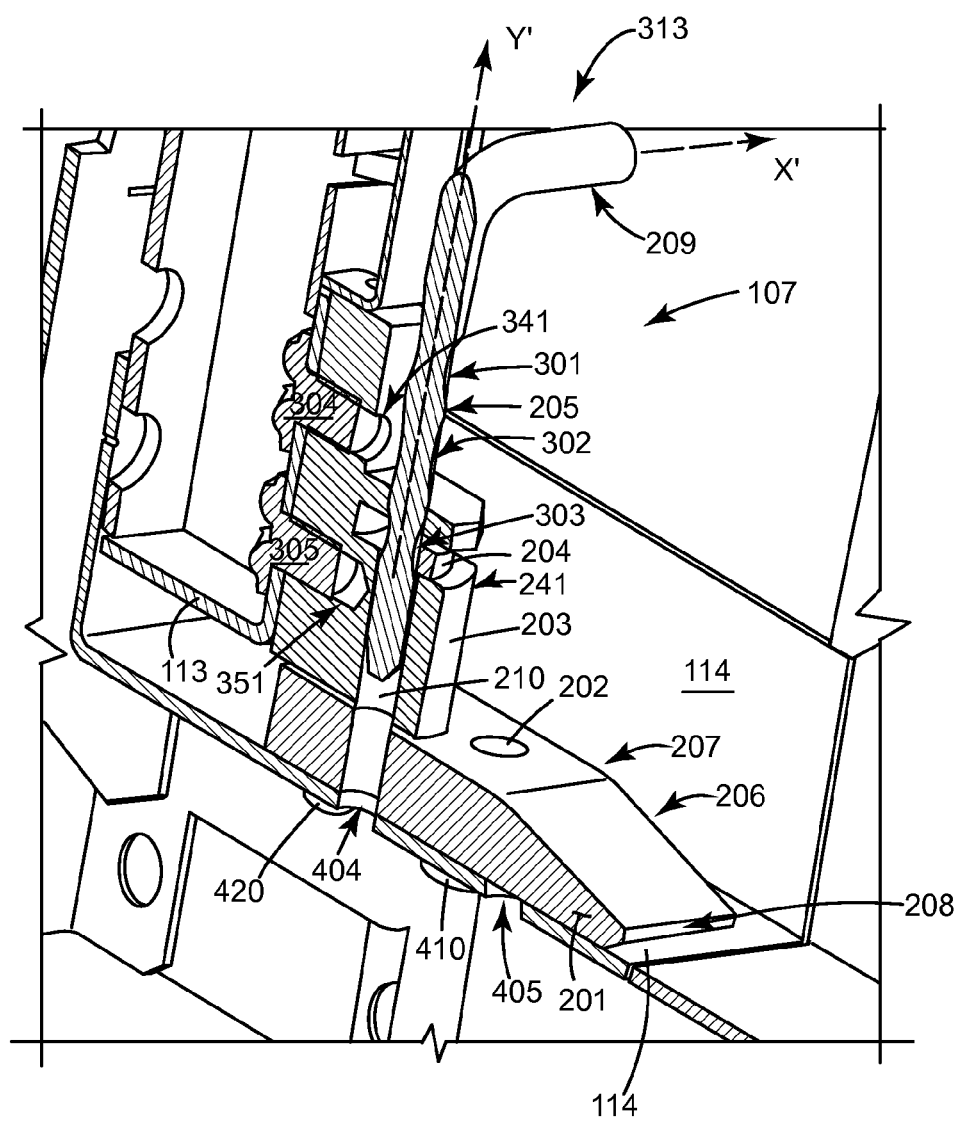
FIG. 6 is a cross-sectional perspective view of the door hinge of FIG. 2.

Turning to FIG. 6, a third hinge position 313 of the three hinge positions may be defined as a position where the hinge pin 205 does not engage the hinge base 201, thereby allowing movement of the hinge body 203 relative to the hinge base 201. As such, this third hinge position 313 may be termed an unlocked hinge position. In this unlocked hinge position, the retention apparatus 204 engages the third retention formation 303 as the third retention position. As further illustrated in FIGS. 3, 4, 5, and 6, the hinge body 203 includes holes 341 and 351 configured to allow attachment of the hinge body 203 to the door frame 113 with fasteners 304 and 305. Thus, in the unlocked hinge position, the door frame 113 is free to swing about axis Y'. The hinge pin 205 illustrated in FIG. 6 is in the unlocked hinge position.

Turning back to FIG. 4 an additional cross-sectional perspective view of the door hinge 107 of FIG. 2 is provided. As illustrated, the locking member 114 includes slot 403 arranged therethrough along axis Z' which is substantially orthogonal to the axis Y'. The locking member 114 further includes pin holes 404 and 405 configured to engage hinge pin 205. Furthermore, the hinge base 201 includes fasteners 401 and 402 (e.g., rivets, bolts, etc.) configured to engage the slot 403. Moreover, each fastener 401 and 402 supports respective distance sleeves 410 and 420 to allow the hinge base 201 to move along the slot 403. Each fastener 401 and 402 may be tightened to allow this movement when forced, but be tightened enough to generally restrict motion otherwise, for example, restricting free motion without an applied force. Therefore, the hinge base 201 may be substantially secured to the locking member 114 through fasteners 401 and 402 while also allowing repositioning along the slot 403 by sliding motion facilitated with sleeves 410 and 420.

For example, if the hinge pin 205 is not engaged in either of pin holes 404 or 405 (e.g., partially locked or unlocked hinge), a user may reposition the hinge base 201 along the slot 403. In this manner, the entire door frame 113 may be moved along axis Z' to allow the hinge pin 205 to engage either of pin holes 404 and 405. In this manner, the entire door frame 113 may be moved into one of two hinge base positions. This is more clearly illustrated in FIG. 7.

Figure 7:
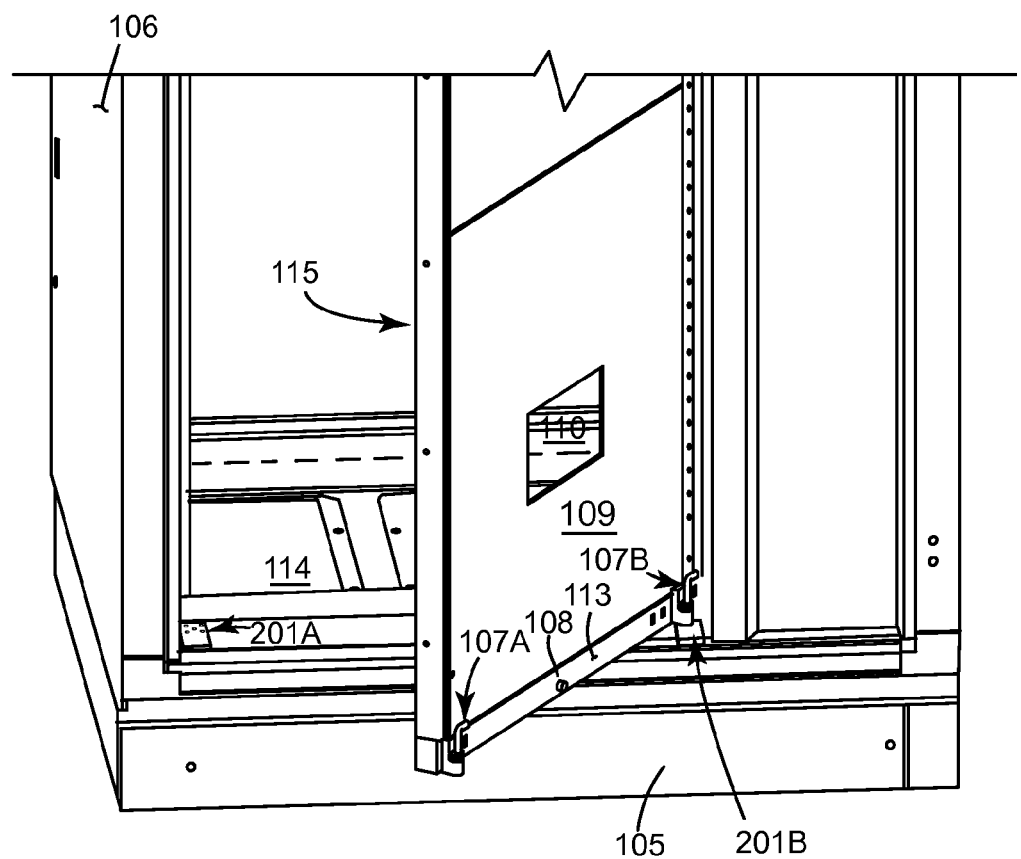
FIG. 7 illustrates an electrical system enclosure including an open door, according to an exemplary embodiment of the present invention.

FIG. 7 illustrates the electrical system enclosure 100 including an open door. As shown a first door hinge 107A and a second door hinge 107B are illustrated in different hinge and hinge base positions. It should be readily understood that opposing door hinges on an upper portion of the door frame 113 are in similar positions, although not illustrated for clarity of discussion.

In a first hinge base position of the two hinge base positions (see 201A and FIG. 4), the hinge base 201 is arranged to allow protrusion of a hinge pin 205 through pin hole 404 such that the door hinge 107A may be positioned in a fully locked or unlocked position. Therefore, as 201A is in the first hinge base position, the door hinge 107A may be unlocked to allow swinging of the door frame 113 about the door hinge 107B. Alternatively, the door hinge 107A may be fully locked.

In a second hinge position of the two hinge positions (see 201B), the hinge base 201 is arranged to allow protrusion of a hinge pin 205 through pin hole 405 such that the door hinge 107B may be positioned in a fully locked or partially locked position. Therefore, as 201B is in the second hinge base position, the door hinge 107B may be fully locked to allow swinging of the door frame 113 about the door hinge 107B. Alternatively, the door hinge 107B may be partially locked to allow repositioning of the hinge base 201 from the second hinge base position 201B into the first hinge base position 201A.

In this manner, respective positions of at least four functional door hinges 107 of an electrical system enclosure 100 door frame 113 may be altered to allow movement of the door frame 113 about two hinge base positions 201A, 201B (i.e., towards or away from the electrical system enclosure 100 such that componentry is cleared from cutouts 110 before swinging open) while also allowing opening of the door frame 113 in a conventionally left or right handed manner. Therefore, the entire door frame 113 may be secured within the electrical system enclosure 100 with fasteners 108 if all four door hinges 107 are in a fully locked hinge position and in the first hinge base position 201A. Furthermore, the entire door frame 113 may be unsecured and allowed to swing open in a conventionally left or right handed manner by positioning a first pair of opposing door hinges 107 (e.g., a first vertically opposing pair) in an unlocked hinge position and first or second hinge base positions 201A, 201B, while positioning a second pair of opposing hinges 107 (e.g., a second vertically opposing pair) in a fully locked hinge position and second hinge base position 201B.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A door hinge, comprising:
   a hinge body, wherein the hinge body includes a first channel, wherein the first channel defines a first axis, wherein the hinge body further includes a slot formed therethrough at a first angle to the first axis, and wherein the hinge body further includes a retention apparatus arranged within the slot;
   a hinge pin operatively disposed in the first channel and configured to travel along the first axis, wherein the hinge pin includes at least three retention formations formed thereon, wherein a first retention formation of the at least three retention formations defines a first retention position, wherein a second retention formation of the at least three retention formations defines a second retention position, wherein a third retention formation of the at least three retention formations defines a third retention position, and wherein the retention apparatus is configured to engage the hinge pin at one of the at least three retention formations; and
   a hinge base, wherein the hinge base includes a second channel configured to operatively receive at least a portion of the hinge pin.

2. The door hinge of claim 1, wherein the hinge pin comprises a first portion and a second portion, the first portion being disposed along the first axis, the second portion being disposed along a second axis at a second angle to the first axis.

3. The door hinge of claim 1, wherein the retention apparatus of the hinge body is a deformable retainer clip.

4. The door hinge of claim 1, wherein the hinge body further includes a plurality of holes configured to receive a plurality of fasteners, respectively.

5. The door hinge of claim 1, wherein the hinge base has a trapezoidal shape.

6. The door hinge of claim 5, wherein the hinge base further includes a first major face orthogonal to the first axis and a second major face inclined relative to the first axis and proximate the first major face.

7. The door hinge of claim 1, wherein:
the first retention position defines a first hinge position;
the second retention position defines a second hinge position; and
the third retention position defines a third hinge position.

8. The door hinge of claim 7, wherein the hinge pin is configured to protrude through the hinge base in the first hinge position.

9. The door hinge of claim 7, wherein the hinge pin is configured to restrict movement of the hinge body relative to the hinge base in the second hinge position.

10. The door hinge of claim 7, wherein the hinge pin is configured to allow movement of the hinge body relative to the hinge base in the third hinge position.

11. An enclosure, comprising:
an upper panel;
an enclosure base opposite the upper panel; and
a door frame arranged between the upper panel and the enclosure base having at least four door hinges, each door hinge of the at least four door hinges comprising:
a hinge body, wherein the hinge body includes a first channel, wherein the first channel defines a first axis, wherein the hinge body further includes a slot formed therethrough at a first angle to the first axis, and wherein the hinge body further includes a retention apparatus arranged within the slot;
a hinge pin operatively disposed in the first channel and configured to travel along the first axis, wherein the hinge pin includes at least three retention formations formed thereon, wherein a first retention formation of the at least three retention formations defines a first retention position, wherein a second retention formation of the at least three retention formations defines a second retention position, wherein a third retention formation of the at least three retention formations defines a third retention position, and wherein the retention apparatus is configured to engage the hinge pin at one of the at least three retention formations; and
a hinge base, wherein the hinge base includes a second channel configured to operatively receive at least a portion of the hinge pin.

12. The enclosure of claim 11, wherein the hinge pin comprises a first portion and a second portion, the first portion being disposed along the first axis, the second portion being disposed along a second axis at a second angle to the first axis.

13. The enclosure of claim 11, wherein the retention apparatus of the hinge body is a deformable retainer clip.

14. The enclosure of claim 11, wherein the hinge body further includes a plurality of holes configured to receive a plurality of fasteners.

15. The enclosure of claim 11, wherein the hinge base has a trapezoidal shape and further includes a first major face orthogonal to the first axis and a second major face inclined relative to the first axis and proximate the first major face.

16. The enclosure of claim 11, wherein:
the first retention position defines a first hinge position;
the second retention position defines a second hinge position; and
the third retention position defines a third hinge position.

17. The enclosure of claim 16, wherein the hinge pin is configured to protrude through the hinge base and engage the enclosure base or the upper panel in the first hinge position.

18. The enclosure of claim 16, wherein the hinge pin is configured to restrict movement of the hinge body relative to the hinge base in the second hinge position.

19. The enclosure of claim 16, wherein the hinge pin is configured to allow movement of the hinge body relative to the hinge base in the third hinge position.

20. The enclosure of claim 11, further comprising a first locking member proximate the upper panel and a second locking member proximate the enclosure base, wherein each of the first and second locking members includes:
at least two slots, wherein each of the at least two slots is arranged substantially orthogonal to the first axis of an associated hinge body and is configured to restrict motion of an associated hinge base along two hinge base positions.

* * * * *